United States Patent
Masuoka et al.

[19]

[11] Patent Number: 6,081,826
[45] Date of Patent: *Jun. 27, 2000

[54] SYSTEM USING ENVIRONMENT MANAGER WITH RESOURCE TABLE IN EACH COMPUTER FOR MANAGING DISTRIBUTED COMPUTING RESOURCES MANAGED FOR EACH APPLICATION

[75] Inventors: Yoshimasa Masuoka, Kodaira; Toyohiko Kagimasa, Sagamihara; Katsuyoshi Kitai, Kokubunji; Fumio Noda, Kodaira, all of Japan

[73] Assignee: Hitachi, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/814,338

[22] Filed: Mar. 11, 1997

[30] Foreign Application Priority Data

Mar. 12, 1996 [JP] Japan .................................. 8-054398

[51] Int. Cl.[7] ........................................................ G06F 9/00
[52] U.S. Cl. .......................... 709/100; 709/101; 709/102; 709/104
[58] Field of Search ..................................... 395/673, 676, 395/672; 705/1; 709/100, 101, 102, 104

[56] References Cited

U.S. PATENT DOCUMENTS

| | | | |
|---|---|---|---|
| 5,136,708 | 8/1992 | Lapourtre et al. | 395/673 |
| 5,293,620 | 3/1994 | Barabash et al. | 395/672 |
| 5,349,656 | 9/1994 | Kaneko et al. | 395/672 |
| 5,428,783 | 6/1995 | Lake | 395/676 |
| 5,535,322 | 7/1996 | Hecht | 705/1 |

*Primary Examiner*—Le Hien Luu
*Attorney, Agent, or Firm*—Antonelli, Terry, Stout & Kraus, LLP

[57] ABSTRACT

In correspondence to an application, a resource table to manage computing resources which are available for the application is provided in a rule such that a plurality of applications can mutually use distributed computing resources which could be used so far by itself and can effectively use many distributed computing resources and an execution performance can be raised. When a certain application executes a cooperative processing together with another application, resource tables are copied and a new resource table for managing resources of both of them is formed. By referring to a newly formed resource table by each application, each application can use both of the computing resources more efficiently.

18 Claims, 12 Drawing Sheets

FIG. 14

| ID No. | MESSAGE NAME | CONTENTS OF DATA |
|---|---|---|
| 1 | SETLOAD | ENTRY |
| 2 | NEWLOAD | ENTRY |
| 3 | FUSION | CONTENTS OF RESOURCE TABLE |
| 4 | SYSCALL | TYPE OF REQUEST TO OS, AND ARGUMENT |
| 5 | SUBEMS | ADDRESS OF ENVIRONMENT MANAGER |
| 6 | SUBEME | ADDRESS OF ENVIRONMENT MANAGER |
| 7 | READY | ADDRESS OF ENVIRONMENT MANAGER |
| 8 | EXTEND | ADDRESS OF ENVIRONMENT MANAGER OR CONTENTS OF RESOURCE TABLE OF ENVIRONMENT MANAGER |
| 9 | REXEC | APPLICATION TO BE EXECUTED |

SYSTEM USING ENVIRONMENT MANAGER WITH RESOURCE TABLE IN EACH COMPUTER FOR MANAGING DISTRIBUTED COMPUTING RESOURCES MANAGED FOR EACH APPLICATION

BACKGROUND OF THE INVENTION

The invention relates to a method for managing a distributed system using a network as communicating means and, more particularly, to a managing method for enabling an application to use computing resources (distributed computing resources) which are distributed and exist in a plurality of computers connected to a network and include a processor, a file system, a magnetic disk storage, and the like.

In association with the recent spread of a network and low prices of computers, a number of computers are connected by the network. When an application is executed by using a plurality of computers connected to the network, a trend such that computing resources (distributed computing resources) distributed and existing in each computer are effectively used from the application is becoming strong. As individual computing resources (hereinafter, properly abbreviated to "resources"), for instance, various kinds such as processor, file, vacant capacity of a magnetic disk storage, and the like can be mentioned.

If the distributed computing environment connected by the network is used, for instance, when an application that is being executed on one computer intends to newly execute another application, by constructing in a rule such that another application is executed by another processor different from a processor in which the self application is operating, there are effects such that a response time is reduced, a capacity of a magnetic disk storage in which data can be newly written is increased, and a reliability upon execution of the application can be raised by distributing and arranging copies of a file to be treated.

However, even if the resources on all of the computers connected to the network are merely wired to the network, they cannot be always used from the application. Because of limitations such that using means is not provided, the use is not permitted, and the like, the distributed computing resources which are available for the application ordinarily become a certain subset of the resources (whole set) on all of the computers. Such a subset is called an "environment" in the following description. The invention relates to means for managing such an environment.

A technique which becomes one of the important elements when an application uses distributed computing resources is a technique to realize a nature called "transparency". The "transparency" denotes the nature such that an application can treat individual resources included in the environment in a manner similar to the resources existing on the same computer as the self computer without needing to be aware of the positions of the computers on the network where the resources actually exist.

To realize the transparency, many techniques have been proposed so far. For example, a Network File System (NFS) has been well known as software which handles a file as distributed computing resources. In such software, it is possible to access from a certain application to file systems distributed to a plurality of computers. As a technique for treating a processor as distributed computing resources, a Butler system of Carnegie-Mellon University can be mentioned. According to such a system, when one application newly executes an application, a processor of a small load is selected, thereby enabling the application to be executed there.

The NFS has been described in the literature "Andrew S. Tanenbaum, 'Distributed Operating System', Prentice-Hall, pp. 272–278, 1995". The Butler system has been described in the literature "David A. Nichols, 'Using Idle Workstations in a Shared Computing Environment', Proceedings of 11th Symposium on Operating Systems Principles, ACM, pp. 5–12, 1987". Both of them are typical systems for enabling the application to use the distributed computing resources and fundamentally have a structure as shown in FIG. 2.

FIG. 2 shows a state in which one or more applications 101 which are executed on a computer 100A use a resource 108 in another computer 100B as one of distributed computing resources by resource managers 102A and 102B (with respect to the resource managers for the NFS and there are denominations of rem and butler as for the Butler system; however, they are generally referred to as "resource managers" here). The applications 101 request the use of the resource 108 without being aware of in which computer the resource 108 actually exists (104). The resource managers are provided one by one for each computer. A utilizer 109 of the resource manager 102A of the computer 100A receives a request 104, refers to a resource table 103 held by itself (105), finds out the computer 100B having the resource 108, and transfers a request from the applications 101 to the resource manager 102B in the computer 100B via a network 5 (106). For a period of time from the reference to the resource table 103 to the transfer of the request to the resource manager 102B, there is also a case where a communication with a resource manager different from 102A and 102B is accompanied. The resource manager 102B receives a request from the resource manager 102A and generates a use request of the resource 108 (107) and returns a proper response in accordance with the request from the applications 101.

That is, by providing the resource managers 102A and 102B for each computer, the applications 101 don't need to prepare by themselves a function to access the computing resource on another computer and can easily use the distributed computing resources disclosed in the resource table 103 by using the resource managers 102A and 102B.

In the distributed computing environment in which the applications can use the distributed computing resources by the existence of the resource managers as mentioned above, a case where the available computing resource is increased due to some reasons will now be considered. Generally, in such a case, if such a resource which was newly made available can be added to the resources which have been managed by the resource managers so far, an effect such that the application is derived by the effective use of the distributed computing resources can be further enhanced.

With respect to such an expansion of the environment, for example, in the NFS, there has been provided means constructed in a manner such that only the user having a certain privilege designates a computing resource (in case of the NFS, file system) to be added, thereby newly adding the file system into a resource table as a management target of the resource managers. In the Butler system, there is provided a function such that when the resource manager is activated on a certain computer, information to use a processor of such a computer is added into a resource table of another resource manager by a file shared by a distributed file system.

When paying attention to the application, on the other hand, in recent years, the number of applications each for performing a cooperative processing together with another application by a communication through a wide area network has been increased. A system called a client server model is generally used as a cooperative processing system between the applications. In the client server model, an application (server) which provides a certain function as a computer service is executed on a certain computer and another application (client) which intends to use the computer service communicates with the server via the wide area network and notifies a self request. The server accepts the request from the client, executes a target process, and returns a response to the client.

It is a feature when a plurality of applications including the client server model execute the cooperative processing through the wide area network that the plurality of applications which are not concerned with each other in terms of the program and a geometric viewpoint newly start a communication during the execution of the processing and, after that, execute the cooperative processing.

SUMMARY OF THE INVENTION

In the case where a plurality of applications execute the cooperative processing as mentioned above, if there is provided means for enabling a peer application to use, in a lump, distributed computing resources which are available by itself or for, contrarily, enabling the self application to use, in a lump, distributed computing resources which are available for the peer application, the available distributed computing resources can be efficiently and largely increased and a large effect is expected when raising an execution performance of the application.

In the distributed computing environment shown in FIG. 2 of the prior art, in each computer, a plurality of applications manage in a lump by one resource manager having one resource table. Therefore, in the case where a partial plurality of applications among the plurality of applications intend to execute the cooperative processing or, further, in the case where they execute the cooperative processing together with applications in another computer, in order to allow all of the applications for performing the cooperative processing to freely use the mutual computing resources, it is necessary to select the computing resource for a specific application from the resource table and to combine it with the computing resource for application of a peer which performs the cooperative processing. Such a process, however, becomes complicated.

That is, means for combining the distributed computing resources which are available for a certain application and immediately knowing them doesn't exist and an efficient method of combining the distributed computing resources for a plurality of applications doesn't exist.

Since a manager having a special authority manages the distributed computing environment, a work by the manager is necessary to expand the distributed computing resources. Therefore, even if the distributed computing resources which are available for the application can be temporarily expanded, for instance, they cannot be dynamically expanded at such a time point. Therefore, it takes a long time until the expansion of the distributed computing resources is executed or the like. Even if the distributed computing resources were expanded, it is difficult to obtain an effect such that a total response time of the application is reduced or the like.

The invention is made to solve those subjects and it is, particularly, an object of the invention to provide a method for managing distributed computing resources in a large scale distributed computing environment constructed by computers connected to a wide area network, wherein a plurality of applications can expand and use distributed computing resources. The invention also intends to provide a method for managing distributed computing resources in which available distributed computing resources can be efficiently expanded.

To accomplish the above object, a resource table for managing computing resources which are available for an application is provided in correspondence to such an application, when a certain application executes a cooperative processing together with another application, their resource tables are mutually copied, thereby forming a resource table to manage both of the resources, and each application refers to such a resource table, thereby enabling each application to use both of the computing resources.

Specifically, in a distributed computer comprising a plurality of computers mutually connected by a network, there are provided: a step of providing, every application, a resource table to manage computing resources which are available for at least one or more applications on each of the computers; a step configured in a rule such that when a first application on the computer intends to communicate with a second application on the computer, it is detected; a step of copying a resource table for the first application and forming a first resource table when it is detected that said communication is executed; a step of copying a resource table for the second application and forming a second resource table when it is detected that the communication is executed; a step of adding contents in the second resource table into the first resource table; a step of adding contents in the first resource table into the second resource table; a step of allowing the first application to execute a communication with reference to the first resource table in which the contents in the second resource table were added; and a step of allowing the second application to execute a communication with reference to the second resource table in which the contents in the first resource table were added.

In a distributed computer which comprises a plurality of computers mutually connected by a network and in which an application on each computer is executed on the basis of information indicative of a available computing resource, there are provided: a step configured in a rule such that when the application intends to communicate with another application, it is detected; a step of, in accordance with a detection of the communication from the application to the other application, transmitting information indicative of the computing resource of such an application itself to another resource manager corresponding to the other application; and a step of, in response to a reception of information indicative of the transmitted computing resource, allowing the other resource manager to add the received information to the information of the self computing resource.

Further, the resource manager is independently provided in correspondence to the application. Moreover, there are also provided: a step of, when the information indicative of the computing resource is transferred to the other application, first forming a copy of such information; and a step of, when the information indicative of such a computing resource is received, first copying a computing resource for an own application and adding the received information indicative of the computing resource to the information indicative of the copied computing resources.

BRIEF DESCRIPTION OF THE DRAWINGS

FIG. 14 is a diagram showing contents of messages.

DESCRIPTION OF THE PREFERRED EMBODIMENTS

An embodiment of the invention will now be described hereinbelow with reference to the drawings.

"Computing resources" are a general denomination of a processor for executing an application program, a magnetic disk storage or file system into/from which a program and data can be stored or read out, and the like. In the embodiment, the processor is used as a computing resource and a method for managing computing resources of the invention will now be described in detail with respect to a case where an application is dynamically allocated to the processor, namely, a case where the invention is applied to a load balancing of the application to the processor. This case doesn't mean that the invention is limited to a management of available processors but, as will be understood from the following description, the invention can be also easily applied to a management of physical computing resources such as magnetic disk storage, optical disk storage, and the like and other logical computing resources such as file, object, and the like.

The embodiment will now be sequentially described hereinbelow. First, in the embodiment, means for allowing an application to use distributed computing resources, namely, an environment which is available by itself will be described. An outline of the operation and, subsequently, a structure and a procedure will now be described with respect to means for expanding the environment of the invention in the embodiment.

A computer network to which the invention is applied will be first described.

Figure 1:
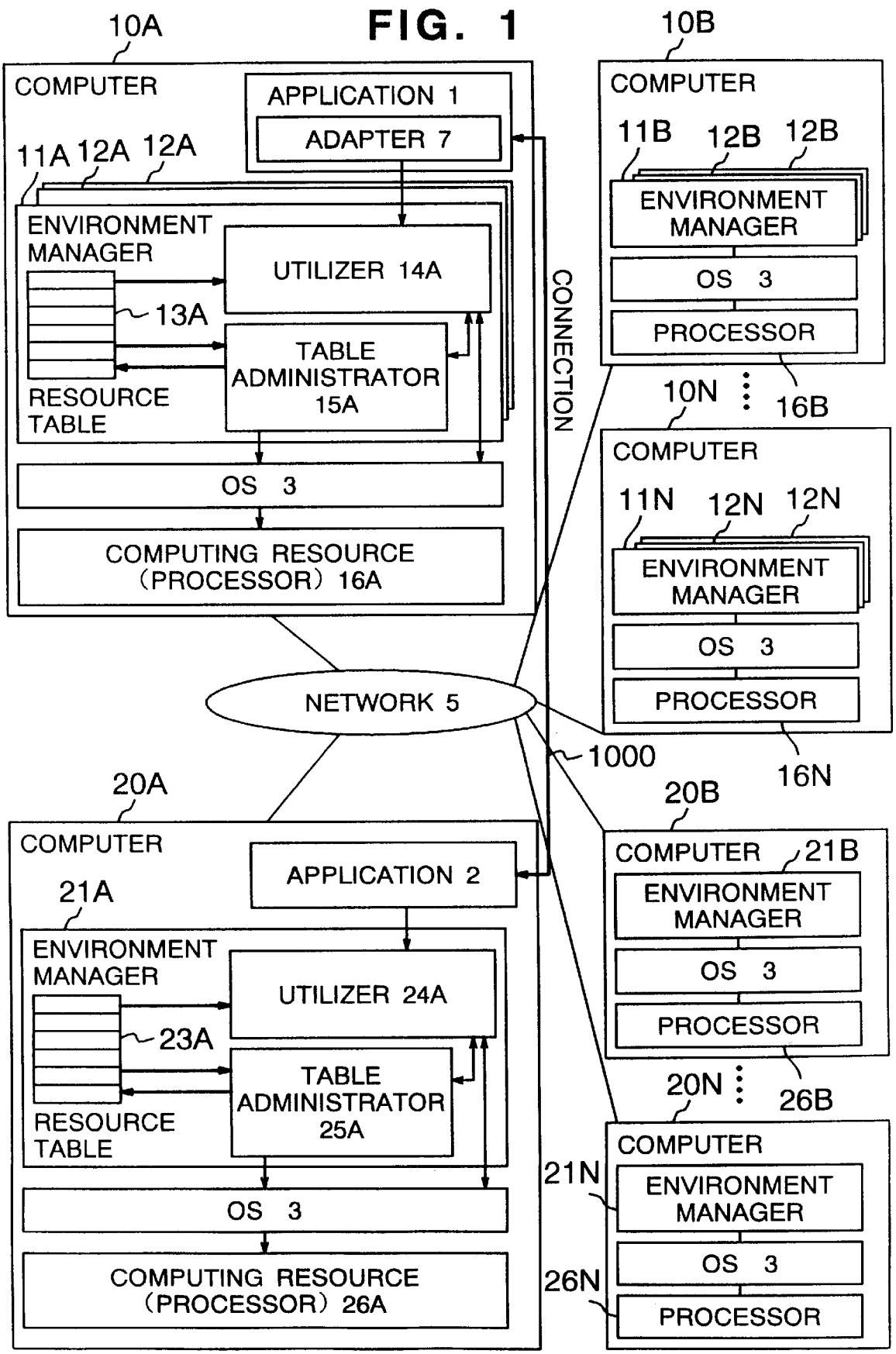
FIG. 1 is a diagram showing a distributed computing environment which serves as a whole image of an embodiment of the invention and comprises computers connected to a network and distributed computing resources.
Figure 2:
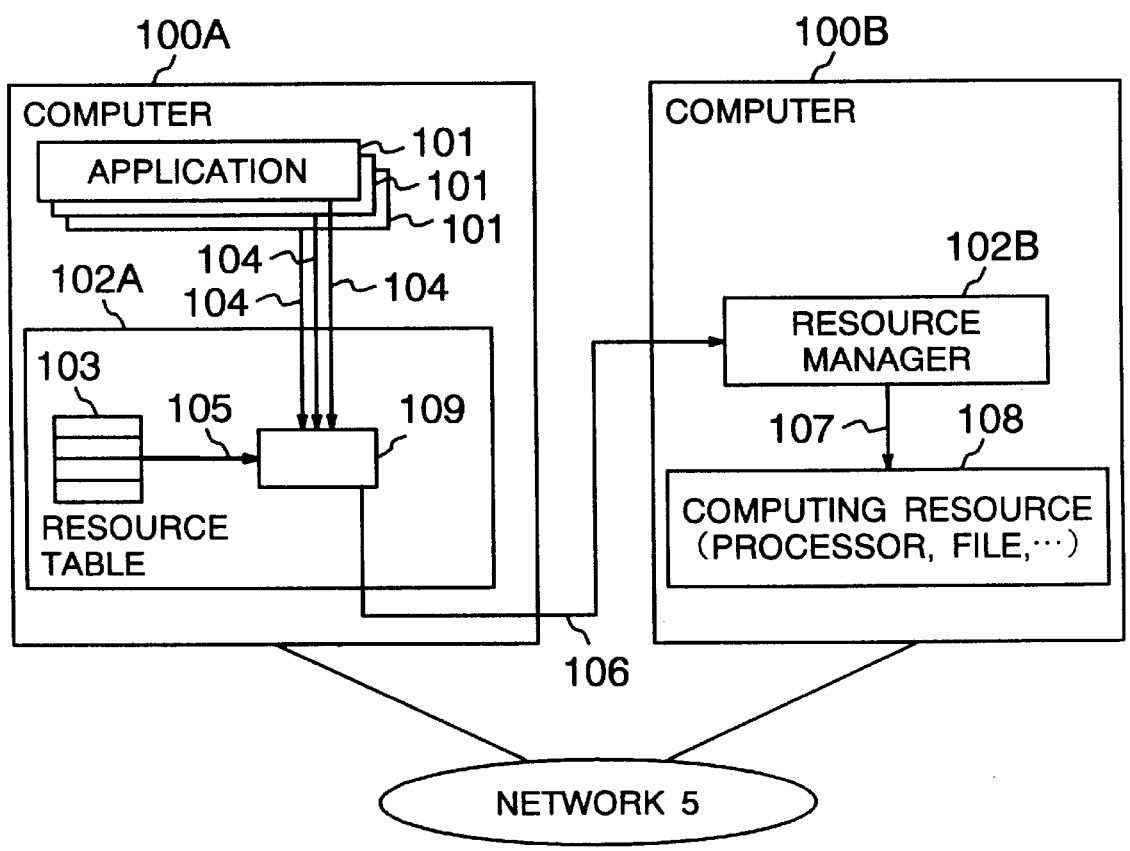
FIG. 2 is a diagram showing a state in which distributed computing resources are available from applications in a prior art.

(1) Computer, computing resources, network communication, operating system:

FIG. 1 shows a distributed computer system in which a plurality of computers are mutually connected by a network. The distributed computer system is a target to which the invention is applied. Computers 10A to 10N and 20A to 20N have processors 16A to 16N and 26A to 26N, respectively.

In the computer 10A, now, under a management of an operating system (OS) 3, one or more applications (although they are also called user processes, tasks, threads, or the like, they are unified as applications in the embodiment) can be executed by using the processor 16A. In the computer 10A, the application which is being executed can allow the self application to be newly executed by issuing a "copy (fork)" and "execution (exec)" requests to the OS 3 or can finish the execution of the self application by issuing an "end" request to the OS (both of the requests of "fork" and "exec" are equivalent in terms of a point that the application is newly executed and a difference between them is not so important so long as the embodiment of the invention as a method for managing the distributed computing resources is explained; therefore, they are generally called an "activation" request in the embodiment for convenience of explanation). As mentioned above, by issuing the request to the OS 3, the application can use the processor 16A as a computing resource.

By designating an application of a peer and issuing a request to the OS 3, t he application of the computer 10A can transmit and receive proper data to/from the other application which is operating on the computers 10B to 10ON and 20A to 20N connected to the network 5.

The description made with respect to the computer 10A and processor 16A shall also similarly apply to the computers 10B to 10N and processors 16B to 16N.

In t he communication between the applications via the network 5, the following procedure is taken as mentioned in the literature "W. Richard Stevens, 'UNIX Network Programming', Prentice-Hall, pp. 171–196, 1991".

An application (called a "client") which intends to communicate with certain another application (called a "server") designates the server and issues a "connection request (connect)" request to the OS 3. The designation of the server is performed by a combination ("address") of an identification number (identification ID) to specify the computer in which the server application is being executed and an identification number (identification ID) provided in correspondence to the application in order to specify the application in the computer.

The address is hereinafter defined as a set of an identification number (identification ID) of the computer and an identification number (identification ID) of the application in the computer. Although there are a case where the identification number is automatically allocated by the OS 3 and a case where the application selects the identification number by itself, the latter identification number is an identification number to specify the application in the same computer. In the communication between the applications in the same computer, different from the foregoing set of the identification number of the computer and the identification number of the application, there is a case where only the identification number (identification ID) provided in correspondence to the application in order to specify the application in the computer is used as an address as necessary.

On the other hand, the server issues a "connection acceptance (accept)" request to the OS 3 and waits for the connection request from the client. When the client issues the "connection request" request to the server and the server receives the connection request, a connection is established between the client and the server and its fact is notified to both of the applications of the client and the server. After that, both applications can transmit and receive proper data to/from the peer through the connection.

When the communication is finished, either one of the client and the server is finished or the connection is designated and a "close (close)" or "shutdown (Shutdown)" request or the like is issued from the application to the OS 3, thereby disconnecting the connection.

As an OS 3 having a function to execute each request mentioned above, for example, there is a disclosure in a literature "B. Goodheart, et al., 'The Magic Garden Explained: The Internals of UNIX System V Release 4', Prentice-Hall, pp. 20–65, 1994". The invention, however, is not limitedly applied to the foregoing OS but can be also easily applied to other OSs.

(2) Use of distributed computing resources by environment manager:

In the invention, a resource manager (hereinafter, called an "environment manager") having a structure which will be explained herein later is provided for the computer system through the network 5.

In FIG. 1, one or more environment managers 11A to 11N and 12A to 12N are provided for the computers 10A to 10N, respectively. The environment managers 11A to 11N manage a set (namely, environment) of the available distributed computing resources of an application 1. The environment of the other applications is managed by the environment managers 12A to 12N. That is, the environment managers are provided in correspondence to the applications.

The environment manager 11A is constructed by: a resource table 13A to record the computing resources which are available for the application 1; a utilizer 14A for deciding a proper computing resource on the basis of a resource table in accordance with a request from the application and reporting to the application; and a table administrator 15A for performing a management of the resource table such as addition, change, deletion, or the like of contents to the resource table. Structures of the environment managers 11B to 11N and 12A to 12N in the other computers are also the same as the above structure.

In the embodiment, although each of the utilizer 14A and table administrator 15A of the foregoing environment manager 11A is one of the applications which are being executed under the management of the OS 3, only denominations of "utilizer" and "table administrator" are used hereinbelow and they are distinguished from the application 1 or the like using the utilizer 14A and table administrator 15A. Although the utilizer and the table administrator are different applications here, they may be two programs in one application. Each of the utilizer 14A and table administrator 15A has one address mentioned above and its function can be accessed by designating the address. Specifically speaking, they can be realized by the method disclosed in the foregoing literature of Stevens or the like. In the invention, it is intended to merely execute the communication between the applications by using the accessing function which is provided by the OS and this point is not an essence of the invention and a further explanation about it is omitted.

The utilizer 14A receives the request from the application 1 in a form of message from an adapter 7, reads out the contents in the resource table 13A, determines an environment manager (in case of the load balancing of the embodiment, environment manager on the computer of the smallest load) that is optimum when the distributed computing resources are effectively used, and communicates with the utilizer of the environment manager which was decided. In this instance, when the computer to which the optimum environment manager belongs is out of the relevant computer, a communication is performed through the network 5. It is constructed so that the application 1 can use the optimum distributed computing resource.

When a change occurs in the contents of the resource table 13A, the utilizer 14A communicates with the table administrator 15A and requests the table administrator 15 to update the resource table 13A. A time when the change occurs in the contents of the resource table 13A is, for example, a time when a load to the processor changes by a new execution, end, or the like of the application, a time when the environment is expanded by a connection of a new computer, an improvement of the computer performance, a change in file, etc., or the like.

The table administrator 15A of the environment manager 11A is an application to manage the table contents of the resource table 13A in the relevant environment manager 11A. The table administrator 15A communicates with the utilizer 14A or a table administrator of an environment manager other than the environment manager 11A, updates the contents of the resource table 13A in accordance with the requests from them, and notifies a fact of the updating to the utilizer of the other environment manager disclosed in the resource table 13A. By the mutual communication among table administrators 15A to 15N, the change in contents of the resource table 13A is immediately reflected to resource tables 13A to 13N of the other environment managers 11B to 11N.

Figure 3:
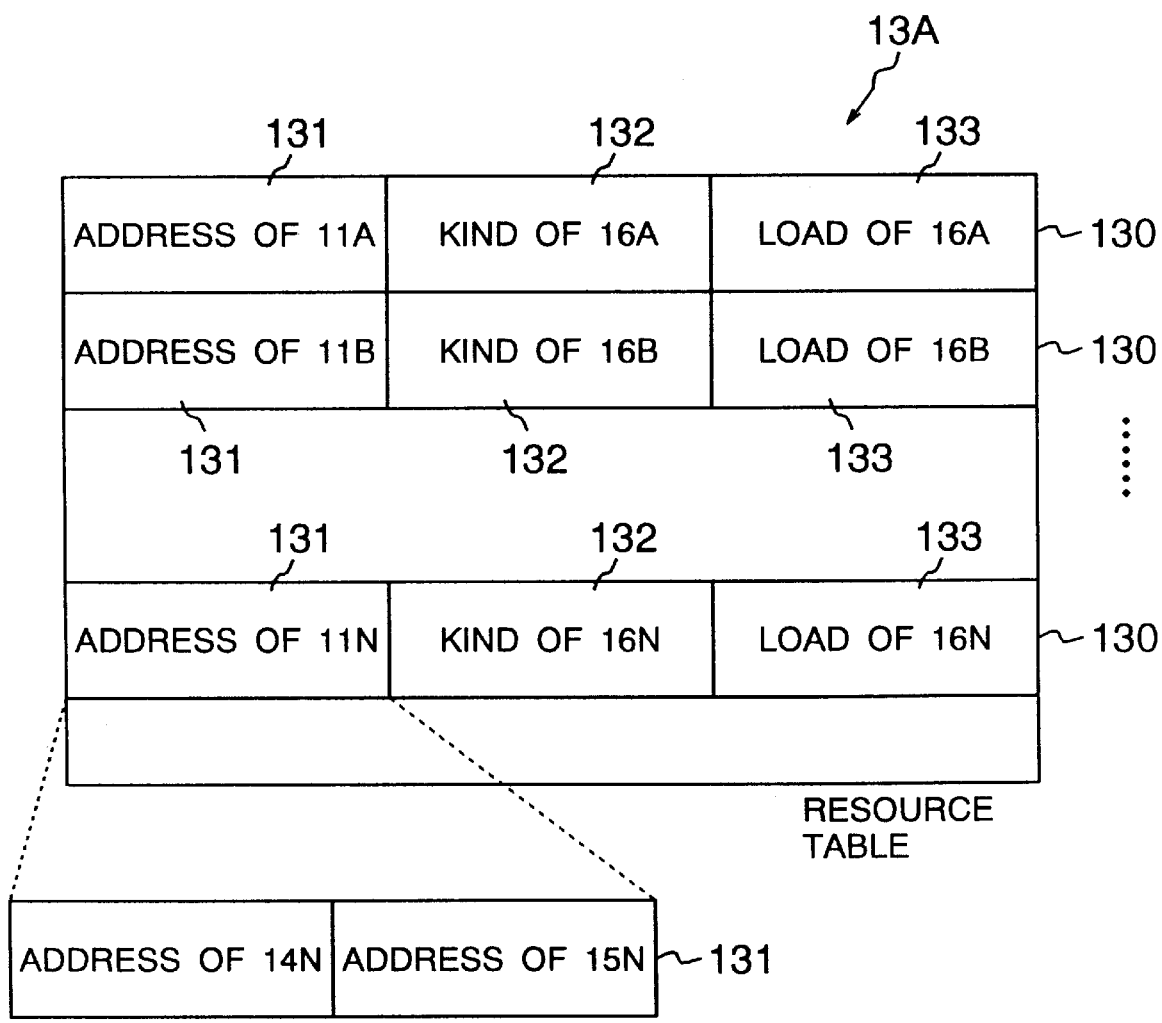
FIG. 3 is a diagram showing contents in a resource table in the embodiment of the invention.

FIG. 3 shows the contents in the resource table 13A of the environment manager 11A in a state in which the environment managers 11A to 11N exist in FIG. 1. The resource table 13A is an area on a memory of the computer 10A which can be referred (read out) from any of the utilizer 14A and table administrator 15A. It is only the table administrator 15A that can write into the resource table 13A and the utilizer 14A executes only the read-out operation for the resource table 13A. By the contents of the resource table 13A, the distributed computing resources which are available for the application 1, namely, one environment which is available for the application 1 is defined.

The resource table 13A is a table serving as one entry 130 with respect to each of the processors 16A to 16N of the computers 10A to 10N. With respect to the processors 16A to 16N corresponding to each entry, a kind 132 of processor indicative of the kind of performance of the processor, command code system, or the like, a present load 133 of the present processor, and information 131 regarding a communicating method when communicating to the environment managers 11A to 11N of the computer in which the processor exists from another computer have been stored in the resource table 13A.

A value converted into a numerical value is used as a load 133. To convert the load into a numerical value, it is sufficient to use the method, for example, disclosed in the literature of Nicols or the like.

Addresses of the environment managers 11A to 11N are stored as information 131 regarding the communicating method to the environment managers 11A to 11N. Specifically speaking, those addresses are constructed by addresses of utilizers 14A to 14N and addresses of table administrators 15A to 15N. The set 131 of those addresses are hereinafter called "addresses of the environment managers". As described in the definition of the foregoing addresses, the identification numbers of the computers in which the environment managers 11B to 11N exist and the identification numbers connected to the environment managers in the computer are included in those addresses.

As mentioned above, in the environment manager 11A for the application 1, since the resource table has the addresses regarding all of the environment managers concerning with the application 1, the environment manager 11A can always immediately communicate with the environment managers 11B to 11N as necessary. The environment manager 11A doesn't immediately and directly communicate with the environment managers 12B to 12N which are not directly concerned with the application 1 because the resource table doesn't have the addresses regarding those environment managers. Therefore, the environment managers 11A to 11N to manage the environment of the application 1 exist independent of the environment managers 12A to 12N which manage an environment of another application.

Figure 4:
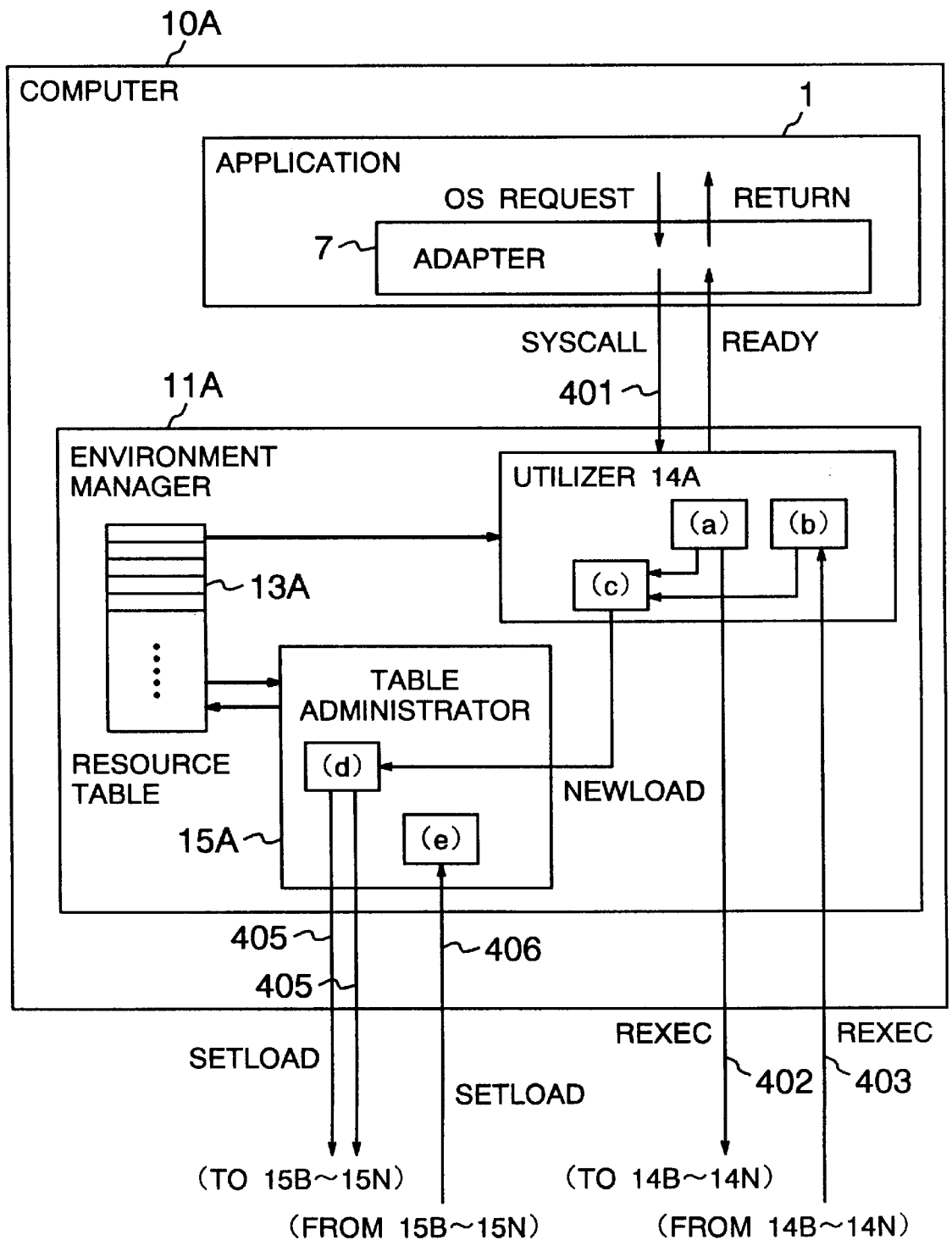
FIG. 4 is a diagram showing a procedure for enabling distributed computing resources to be used from applications in the embodiment of the invention.
Figure 6:
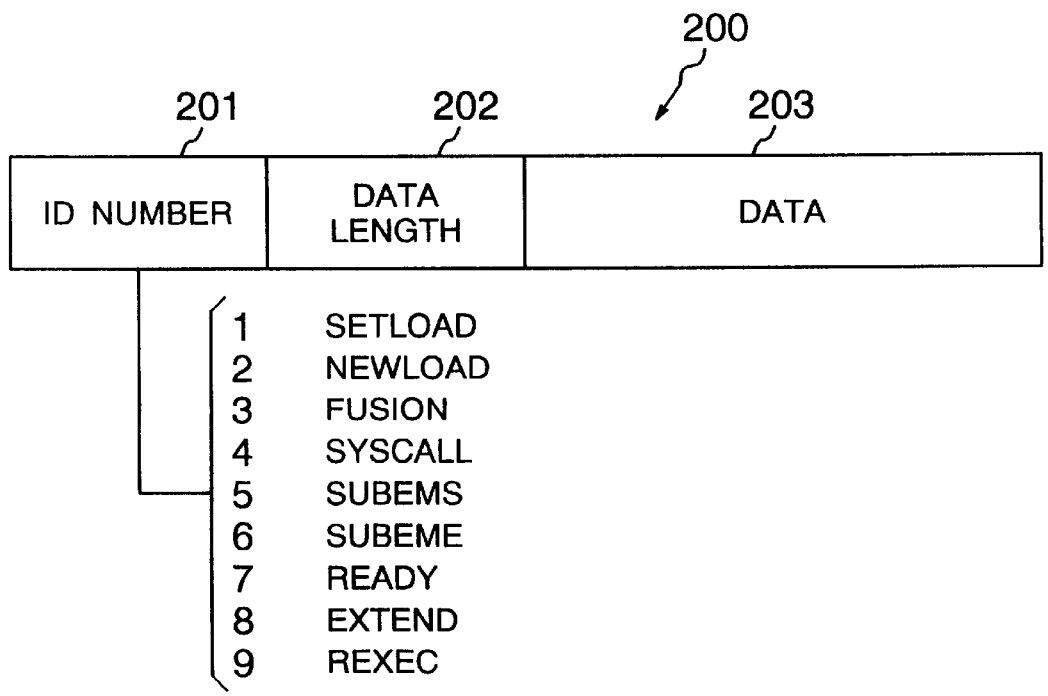
FIG. 6 is a diagram showing a message format in the embodiment of the invention.

FIG. 4 shows a procedure when the environment manager 11A provides the distributed computing resources to the application in accordance with a request from the application in a state in which the environment managers 11A to 11N exist in FIG. 1, namely, a procedure when the environment manager 11A enables the distributed computing resources to be used by the application. Messages such as REXEC, NEWLOAD, and the like, which will be explained hereinbelow, are used for communication among the environment managers and their formats are shown in FIG. 6. Those procedures are realized in a form of program.

The utilizer 14A has the following procedures (a) to (c).

(a) When an "activation" request from the application 1 to request an allocation of the computing resources which can execute the relevant application is detected (401), one of the processors 16A to 16N of the computers 10A to 10N is selected with reference to the resource table 13A. As a selection reference, for instance, in case of the environment manager for a load balancing as an object, the processor which can execute the relevant application and in which the load is smallest is selected. The utilizer 14A transmits a REXEC message 402 including information necessary to execute the designated application on the processor to the environment manager of the computer to which the selected processor belongs via the network 5.

(b) When a REXEC message 403 is received from the utilizers 14B to 14N of the environment managers 11B to 11N in the other computer, a request to execute the application which is designated in the REXEC message, namely, the "activation" request is issued to the OS 3 and the application designated in data 203 of the REXEC message 403 is executed on the self computer 10A (as for the more detailed point about the execution of the application, there is a disclosure in the foregoing literature of Nicols or the like). A code of the REXEC message is merely set to 402 when it is seen from the transmission side and to 403 when it is seen from the side of receiving it.

(c) When an application is newly executed by the procedure (a) or (b), a change in load occurs in the processor. However, the load change needs to be reflected to the resource table. To realize it, an NEWLOAD message 404 is transmitted to the table administrator 15A in order to notify of a fact that the change occurs in the load of one of the processors 16A to 16N of the computers 10A to 10N by the new execution of the application by the procedure (a) or (b).

The table administrator 15A has the following procedures (d) and (e).

(d) When the change in load of a processor 4 of the self computer 10A is detected, the contents of the entry 130 in the resource table 13A corresponding to the processor are updated. Further, with reference to each entry 130 of the resource table 13A, an SETLOAD message 405 to notify of a fact that the load of the processor of the computer 10A changed is transmitted to the table administrators 15B to 15N of the other environment managers 11B to 11N written in the entry. The change in load of the processor 4 is detected by, for example, receiving the NEWLOAD message 404 from the utilizer 14A by the procedure (c) or issuing a periodic inquiry request of a load value from the table administrator to the OS 3.

(e) An SETLOAD message 406 from the table administrators 15B to 15N of the environment managers 11B to 11N of the other computer by the procedure (d) is received. The contents of the corresponding entry in the resource table 13A are updated in accordance with the contents of the SETLOAD message received.

The environment managers 11A to 11N have the procedures described above. Therefore, the application 1 that is being executed on the computer 10A requests the computing resources to execute the application to the environment manager 11A, thereby enabling the processors 16A to 16N of the computers 10A to 10N to be used. Specifically, when the application 1 intends to activate a new application, the application 1 designates an application to be newly activated and issues a request to the environment manager 11A. The utilizer 14A of the environment manager 11A which received the request from the application 1 executes the procedures (a) and (b), thereby allowing the new application to be executed by one of the processors 16B to 16N other than the processor 16A as necessary. For example, now assuming that the computer in which the load value of the processor is smallest is the computer 10A to which the utilizer 14A itself belongs, there will be no problem even if a new application is allocated to the computer 10A to which the utilizer itself belongs.

The loads of the processors 16A to 16N are held in the resource table 13A by the procedure (c) of the utilizer 14A and the procedures (d) and (e) of the table administrator 15A. Therefore, by selecting the computer in which the load is lightest in the procedure (a), the load is distributed to the processors 16A to 16N disclosed in the resource table 13A and an executing speed of the application 1 can be raised.

Actually, in order to realize that the utilizer 14A and table administrator 15A refer to the resource table 13A and both of them communicate with each other, they are executed by issuing a proper request to the OS 3 on the basis of the method described in detail in "W. Richard Stevens, 'UNIX Network Programming', Prentice-Hall, pp. 87–170, 1991", or the like. For simplicity of explanation, in the embodiment, an explanation about the intervention of the OS 3 in the reference to the resource table 13A or the communication between the utilizer 14A and table administrator 15A is omitted.

The communication between the environment managers through the network 5 is executed by issuing a proper request to the OS 3 on the basis of the method disclosed in the literature of Stevens (pp. 171–196) or the literature of Goodheart, et al., or the like. For simplicity of explanation, in the embodiment, an explanation about the intervention of the OS 3 in the communication between the environment managers is omitted.

In FIG. 1, structures and functions of environment managers 21A to 21N, a resource table 23A, a utilizer 24A, and table administrator 25A on the computers 20A to 20N are almost the same as those of the environment managers 11A to 11N, resource table 13A, utilizer 14A, and table administrator 15A except that they correspond to the function for receiving a request from an application 2 and distributing a load to the processors 26A to 26N, respectively.

The invention provides a method whereby in the computer network shown in FIG. 1 described above, each of the applications 1 and 2 which were independently executed enables the distributed computing resources which could be used so far by each application to be also used by an application of a communication peer when a communication is newly started (a connection is established) (1000), thereby efficiently expanding the environment.

The connection between the applications 1 and 2 is established by issuing a request to require the OS 3 to connect those applications. In this case, however, in the embodiment, the environment managers 11A and 21A detect such a request and mutually transmit the contents of the resource tables 13A and 23A before the applications of both of them start the communication, and add the received contents into the self resource table, respectively. In the distributed computer to which the invention is applied, therefore, when the applications 1 and 2 are connected and processes are executed, by referring to the contents of the resource table which was newly added, the distributed computing resources used by the communication peer are available as self computing resources.

The detection of the request to the OS will now be described.

Figure 5:
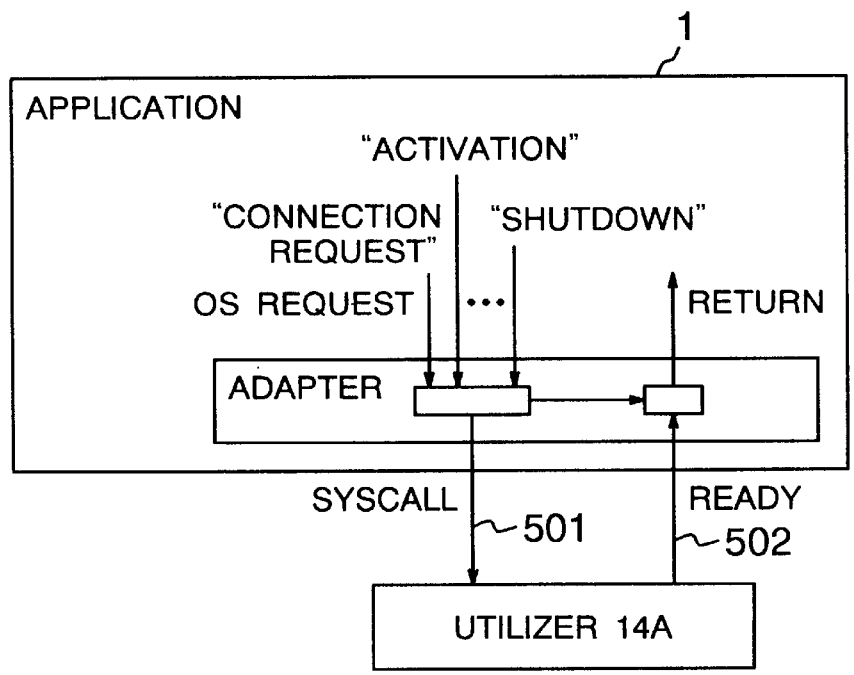
FIG. 5 is a diagram showing a relation between an adapter and an environment manager in the embodiment of the invention.

(3) Detection of the request to the OS:

FIG. 5 shows in detail the function such that the request from the application 1 to the OS 3 is detected in the utilizer 14A of the environment manager 11A in the embodiment. In FIG. 5, the adapter 7 (adapter that is realized in a software manner) is inserted in the program of the application 1.

When the application issues a request to the OS 3, the program in the adapter 7 detects a request which exerts an influence on the contents in the resource table such as request regarding the execution of the program, request to connect to the other application, or the like among the requests which are issued by the application to the OS 3. Since the request from the application to the OS is performed by a function name, for example, such detection can be performed by examining the function name. For the requests other than those requests, the requests are transferred as they are to the OS 3.

The adapter which detected the request temporarily holds the detected request into the adapter and transmits an SYSCALL message 501 to the utilizer 14A of the environment manager 11A corresponding to the application which issued such a request on the basis of, for instance, the means disclosed in the literature of Stevens (pp. 87–170). The application 1 notifies the OS 3 of a fact that the request (for example, "connection request" or the like) was issued.

In the embodiment, after the adapter 7 sent the SYSCALL message 501 to the utilizer 14A, it waits for an READY message 502 from the utilizer 14A. For this period of time, the request issued by the application 1 stops in the adapter 7 and is restarted when the READY message 502 is received from the utilizer 14.

The insertion of the adapter 7 into the program of the application 1 can be realized by any one of a form in which it is built in the application 1 from the beginning and a form in which it is automatically inserted when the application 1 is activated. In any form, the program of the application 1 doesn't need to be aware of that the adapter 7 has been inserted, so that by using the embodiment, the development and use of the application doesn't remarkably become difficult.

(4) Message:

FIG. 6 shows a format of a message 200 which is used in a communication between the environment managers, between the adapter and the environment manager, or the like in the embodiment. All of the communications which are used in the procedures (a) to (e) and procedures (f) to (r), which will be explained herein later, have such a format. When those messages are issued to the OS by designating a destination application by the address in the computer, the OS sends those messages to the application on the destination side.

The message is constructed by an identification number 201 indicative of the kind of message, a data length 202, and the data 203. Each of the identification number 201 and data length 202 has a fixed length and an integer of 0 or more is stored, respectively. The data 203 has a variable length and its format differs depending on the kind (identification number) of message. FIG. 14 shows the kind of message in the embodiment, the corresponding identification number 201, and the contents of the data 203. The data length of data 203 of each message is stored in the data length 202.

Although there are also messages which are not yet described in FIG. 14, the meaning of each message 200 will now be described.

The SETLOAD message is used to notify of a fact that a change occurred in the load of one of the processors 16A to 16N of the computers 10A to 10N. The entry 130 (refer to FIG. 3) corresponding to the processor in which the load changed is stored in the portion of the data 203. The SETLOAD message is transmitted by the procedure (d) in the table administrator of the environment manager existing on the processor with the changed load among the computers 10A to 10N. The SETLOAD message is received in the table administrator of the other computer and is processed by the procedure (e).

In a manner similar to the SETLOAD message, the NEWLOAD message is used to notify of a fact that a change occurred in the load of one of the processors 16A to 16N of the computers 10A to 10N. The entry 130 corresponding to the processor in which the load changed has been stored in the data 203 of the NEWLOAD message. It is a point different from the SETLOAD message that the NEWLOAD message is used in the communication between the utilizer and the table administrator in the same computer and is not used in the communication via the network 5. There are two kinds of paths in the communication of the NEWLOAD message. One of them is a path in which the utilizer 14A transmits the NEWLOAD message by the procedure (c) which has already been mentioned and the table administrator 15A receives the transmitted NEWLOAD message. After that, the table administrator 15A which received the NEWLOAD message calls the procedure (d). The other is a path in which after completion of the copy of the environment manager 11A, which will be explained herein later, the table administrator 15A transmits the NEWLOAD message by the procedure (h) and a procedure (h2) of a table administrator 35A of an environment manager 31A which was newly activated and belongs to the environment manager 11A receives the NEWLOAD message. The latter path will be described herein later by using FIG. 8.

According to an FUSION message, the contents of the resource table 13A are stored into the data 203. As will be explained herein later by using FIG. 9, when a communication is started between different applications, the FUSION message is used for a utilizer 34A of the environment manager 31A corresponding to each application to mutually exchange the contents of the resource table 13A by a procedure (i2). The FUSION message received by the utilizer 34A is further transmitted to the table administrator 35A. The table administrator 35A which received the FUSION message adds the data 203 of the FUSION message into a resource table 33A by a procedure (k) as an expansion amount 53A to the table 13A existing inherently in the resource table 33A.

When the application 1 issues the request to the OS 3, the SYSCALL message is used for the application 1 to notify the environment manager 11A corresponding to the application 1 of a fact that the application 1 issued the request to the OS 3. As already described, when the request to the OS 3 is detected, the SYSCALL message is transmitted to the utilizer 14A by the adapter 7 and is received by the utilizer 14A of the environment manager 11A corresponding to the application 1. The kind of request issued from the application 1 to the OS 3 and a parameter of the request are stored in the data 203 of the SYSCALL message. The kind of request is expressed by an integer of 0 or more and is determined by the OS 3. The SYSCALL message is not sent to the other computer via the network 5. Therefore, a different OS 3 is used in dependence on the computer and even when a different number is allocated for the kind of request from the application, an error with respect to the kind of request issued by the application doesn't occur between the transmission side and the reception side in the transmission and reception of the SYSCALL message.

Figure 7:
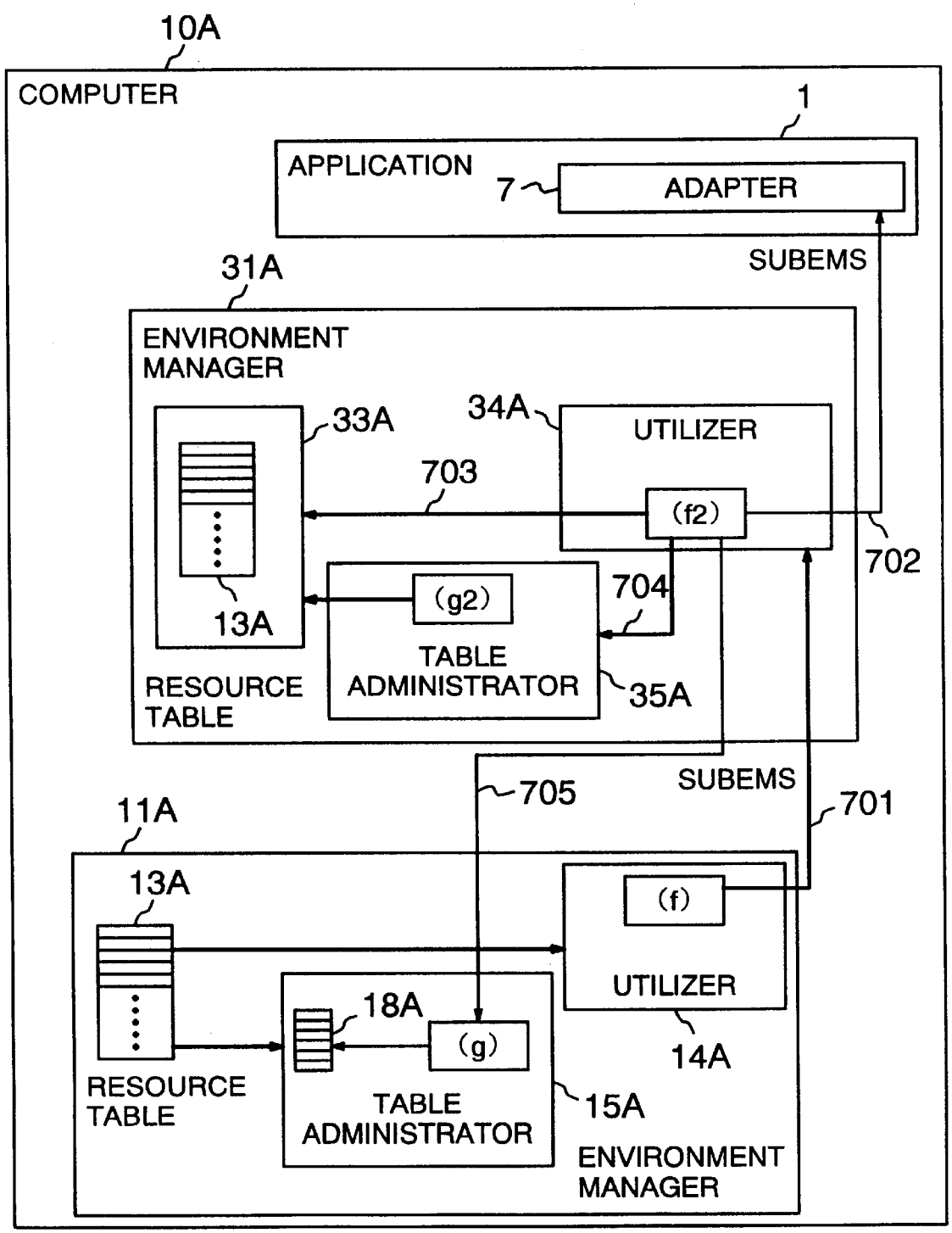
FIG. 7 is a diagram showing a procedure to realize a copy of an environment manager in the embodiment of the invention.

When the environment manager 11A, which will be explained herein later by using FIG. 7, is copied, an SUBEMS message is used to inform the address of the new environment manager 31A. The address 131 of the environment manager 31A which was formed by the copy of the environment manager 11A and belongs to the environment manager 11A is stored in the data 203 of the SUBEMS message. The SUBEMS message is transmitted from a procedure (f2) in the utilizer 34A of the environment manager 31A to the table administrator 15A of the environment manager 11A and the adapter 7. The table administrator 15A which received the SUBEMS message stores the data 203 of the received SUBEMS message into a management table 18A, thereby holding the address of the environment manager 31A belonging to the environment manager 11A. After that, the adapter 7 which received the SUBEMS message transmits the SYSCALL message to the address of the utilizer 34A disclosed in the data 203 of the received SUBEMS message.

In association with the end of the communication between the different applications or the end of the execution of the application itself, when the execution of the environment manager 31A (belonging to the environment anager 11A) corresponding to the application is finished, in order to notify the end of the execution of the environment manager 31A, the SUBEMS message is transmitted from the utilizer 34A of the environment manager 31A to the table administrator 15A of the environment manager 11A and the adapter 7 of the application 1 by a procedure (m2), which will be explained herein later. The address 131 of the environment manager 11A is stored into the data 203 of the SUBEMS message.

The table administrator 15A which received the SUBEMS message deletes the entry corresponding to the address of the utilizer 34A as a transmitter from the management table 18A (by the function of the OS 3, when the SUBEMS message is received, the table administrator 15A can know the address of the transmitter. After the SUBEME message was received, the adapter 7 transmits the SYSCALL message which has already been described to the utilizer 14A of the environment manager 11A disclosed in the data 203 of the SUBEME message.

The READY message is a message which is transmitted to the adapter 7 of the application 1 from the utilizer 14A of the environment manager 11A corresponding to the application 1. The READY message notifies the adapter 7 of a fact that the distributed environment resources for the application 1 has been prepared and also requests a restart of the stopped application 1.

As already mentioned, when the request is issued to the OS 3, the control is shifted to the adapter 7 and the execution of the application 1 is stopped in order to synchronize with the environment manager 11A. When the READY message is received, the adapter 7 returns the control to the application 1. The application to which the control was shifted restarts the execution of the application 1 which was interrupted (stopped). The READY message doesn't have the data 203.

An EXTEND message is used when setting the environment (which will be explained herein later by using FIG. 13). There are four kinds of paths in the communication by the EXTEND message.

The first one of them is a path from the adapter 7 of the application 1 to the utilizer 14A of the environment manager 11A and the EXTEND message is transmitted in place of the foregoing SYSCALL message. In this instance, an address of an environment manager 61A to be newly added in the resource table 13A of the environment manager 14A is stored in the data 203 of the EXTEND message. The second is a communication path between the utilizer 14A in the environment manager 11A and a utilizer 64A in the environment manager 61A. The third is a communication path between the utilizer 14A in the environment manager 11A and the table administrator 15A. The fourth is a communication path among the table administrators 15A to 15N of the environment manager. In case of the second to fourth paths, the contents of the resource table of the environment manager are stored in the data 203 of the EXTEND message.

When setting the environment, the adapter 7 transmits the EXTEND message to the utilizer 14A instead of the SYSCALL message. The utilizer 14A which received the EXTEND message further mutually exchanges the resource table with the utilizer 64A by using the EXTEND message and adds it into the self resource table.

After the utilizer 14A received the EXTEND message by a procedure (n), the EXTEND message is used to notify the contents received by the EXTEND message to the table administrator 15A for managing the resource table 13A. The table administrator 15A which received the message from the utilizer 14A calls a procedure (p), adds the contents of the data 203 into the resource table 13A, and further transmits the EXTEND message to the table administrators 15B to 15N of the environment managers 11B to 11N. The table administrators 15B to 15N which received the EXTEND message from the table administrator 15A call a procedure (q) and add the contents of the data 203 of the received EXTEND message into the resource tables 13B to 13N, respectively.

When an application is newly executed in different computers, the REXEC message is communicated between the environment managers. An application to be executed has been stored in the data 203 of the REXEC massage. The application to be executed may be a file name of a file in which the executable program has been stored or a program itself. In the utilizer 4A, the REXEC message is transmitted to the utilizers of the environment managers on the different computers by the procedure (a). The utilizer 14A which received the REXEC message calls the procedure (b) and activates the application designated by the data 203 of the REXEC message (as mentioned above) by the computer 10A in which the utilizer itself is being executed.

As already mentioned above, the message is exchanged between the adapter 7 and utilizer 14A. In this instance, the adapter 7 doesn't directly send the message 200 to the procedure (a) of the utilizer 14A but, specifically, the procedure is executed by the following steps. Although not shown in the diagram, a step of receiving the message 200 irrespective of the type of message 200 and a step of examining the identification number 201 of the message 200 and the contents of the data 203 and calling the necessary procedure (for example, when the identification number is equal to 4 (SYSCALL) and the identification number of the request to the OS 3 disclosed in the contents of the data 203 corresponds to the "activation" request, the procedure (a) is called) exist in the utilizer 14A. In the embodiment, the meaning of each message can be identified by the identification number 201, the contents of the data 203, and the address (which can be obtained by the function of the OS 3) of the transmission source and the procedure (b) is not erroneously called when the utilizer 14A receives the SYSCALL message. The same shall also apply to the table administrator 15A and the others.

(5) Setting of environment:

In the above description of the embodiment, the environment managers 11A to 11N have already operated in the computers 10A to 10N (the same shall also similarly apply to 20A to 20N) in FIG. 1 and, further, the entries corresponding to the environment managers 11A to 11N have already existed in the resource tables 13A to 13N of the environment managers (namely, one environment has already been set), respectively. However, from a state in which the computers 10A to 10N are inherently not related to each other, means for arriving at such a state, namely, means for setting one environment is necessary. For example, like a case of connecting a new computer to the network 5 or the like, if there is means for increasing the computing resources which are available for the application 1 irrespective of the communication between the applications, which will be explained herein later, the environment manager of the invention becomes more useful. In the embodiment, they are realized as follows.

Figure 13:
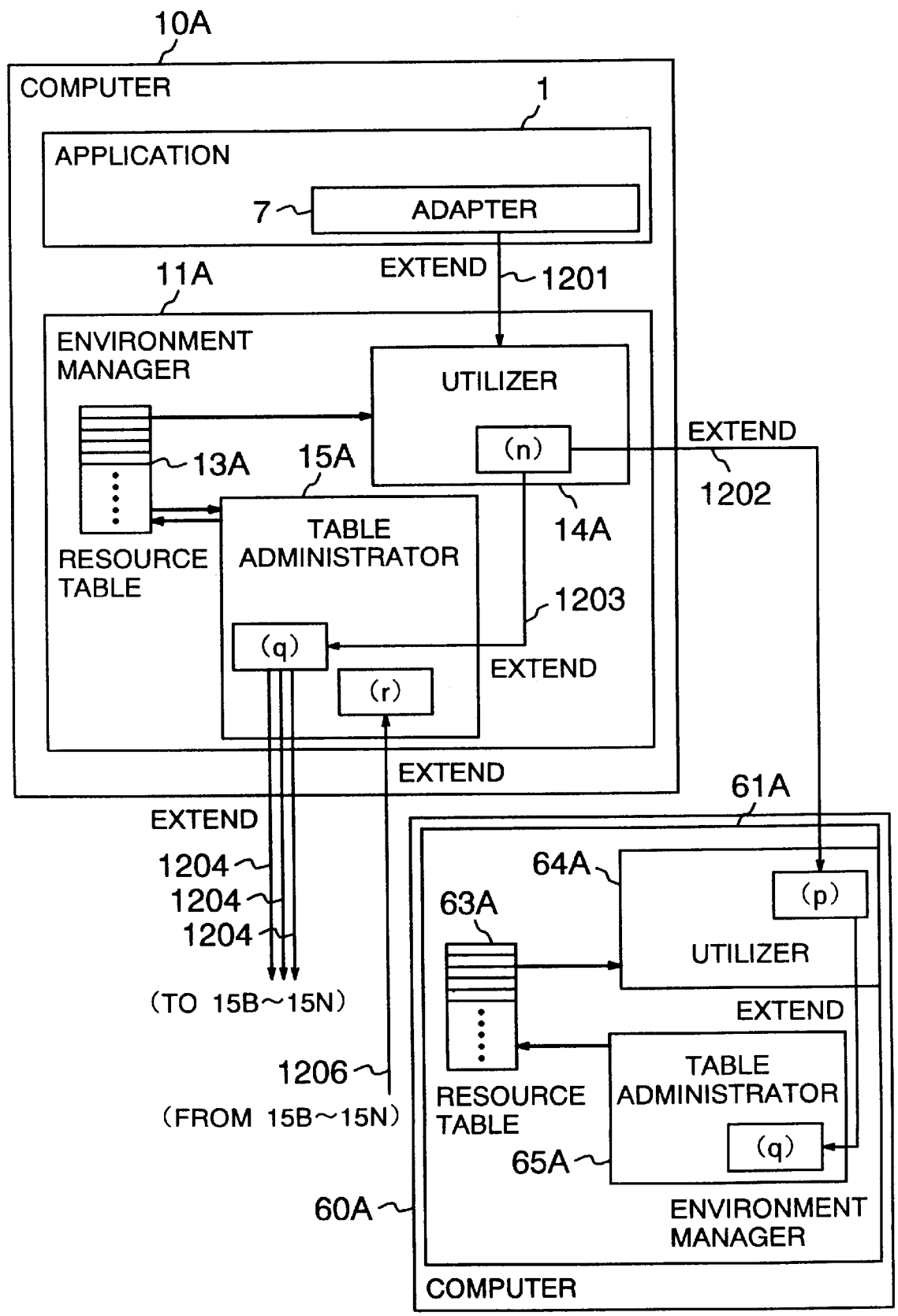
FIG. 13 is a diagram showing a procedure to set an environment in the embodiment of the invention.

FIG. 13 is a diagram showing a procedure in the case where in a state in which the environment managers 11A to 11N operate on one or more computers 10A to 10N in FIG. 1, the environment manager 61A which operates in a computer 60A is added by the environment manager 11A. First, the adapter 7 of the application 1 transmits an EXTEND message 1201 to the utilizer 14A of the environment manager 11A. An address of the environment manager 61A to be added (means for knowing this address will be explained herein later) has been stored in the data 203 of the EXTEND message 1201.

The following procedures are provided for the utilizer 14A.

1(n) When the EXTEND message including the address, as data, of the environment manager 61A to be expanded is received from the adapter 7 of the application 1, the contents of the resource table 13A are read out. An EXTEND message 1202 in which the contents read out from the resource table 13A have been stored as data 203 is transmitted to the utilizer 64A of the environment manager 61A. After that, the apparatus waits until the EXTEND message 1202 as a response of the transmitted EXTEND message is received from the utilizer 64A of the environment manager 61A. When the EXTEND message as a response is received, the EXTEND message is transmitted to the table administrator 15A (1203).

The following procedures are provided for the utilizer 64A.

(p) When the EXTEND message from the utilizer 14A is received, the contents of a resource table 63A are read out and the EXTEND message 1202 in which the read-out contents have been stored as data 203 is returned as a response to the utilizer 14A. The received EXTEND message is transmitted to a table administrator 65A.

The following procedures (q) and (r) are provided for the table administrators 15A and 65A. Although the case of the table administrator 15A is disclosed here, even in case of the table administrator 65A, the procedures are almost the same except that the processes are executed in the environment manager 61A.

(q) When an EXTEND message 1203 is received from the utilizer 14A, the EXTEND message is further transmitted to the table administrators 15B to 15N of the environment managers disclosed in the resource table 13A (1204). The contents of the data 203 of the received EXTEND message are added into the resource table 13A.

(r) When an EXTEND message 1206 is received from the table administrators 15B to 15N, the contents of the data 203 are added into the resource table 13A.

By the above procedures, the setting of the environment mentioned above can be performed. That is, now assuming that the computers 10A to 10N are not related to each other, the environment managers 11A to 11N are activated by the OS 3 in each computer. At this time point, the resource tables 13A to 13N of each environment manager have only one entry 130 corresponding to itself. The user now activates a special application (utility program) for setting an environment as an application 1 of the environment manager 11A and inputs the addresses of the environment managers 11B to 11N into the application one by one. The application 1 to which the addresses were inputted transmits the EXTEND message to the utilizer 14A through the adapter 7. The entries are added one by one into the resource table 13A (and the resource table of the environment manager in which the entry corresponding to the resource table 13A has already existed) by the foregoing procedures. Finally, the state of the environment managers 11A to 11N in FIG. 1 is realized.

Although there are various methods whereby the user knows the addresses of the environment managers 11B to 11N, for example, a method of displaying the address on the screen when the environment manager is activated or the like is considered. It is also easy to form a program for imitating the action of the user mentioned above and such a program can be also used. In any method, it is sufficient to set the environment only once and there is no need to execute each time the user intends to activate some application.

Even when a computer is newly purchased as mentioned above or the like, such a computer can be also added to the computing resources which are available for the application in a manner similar to the setting of the environment mentioned above. According to the method of the embodiment, the addition of the computing resource can be performed during the execution of the application (ordinary application instead of the utility program). The application can use the new computing resource from a time point when it was added. There is no need to finish the application once for such a period of time.

(6) Expansion of environment in which the start of communication between the applications is set to an opportunity:

When the communication between the applications is started, the application 1 performs an expansion of an environment such that mutual environments can be mutually used by setting a communication start (connection) 1000 between the application 1 and the different application 2.

The environment managers 11A and 21A corresponding to each application detect requests which are issued from the applications 1 and 2 to the OS 3. Before both of the applications start the communication, the mutual contents of the resource tables 13A and 23A are mutually transmitted and the received contents are added to the self resource tables, thereby realizing an expansion of the environment. An expanding method of the environment in the embodiment will now be specifically explained hereinbelow. First, an outline of the operation is shown and the operation of each portion will be described in detail after that.

Figure 10:
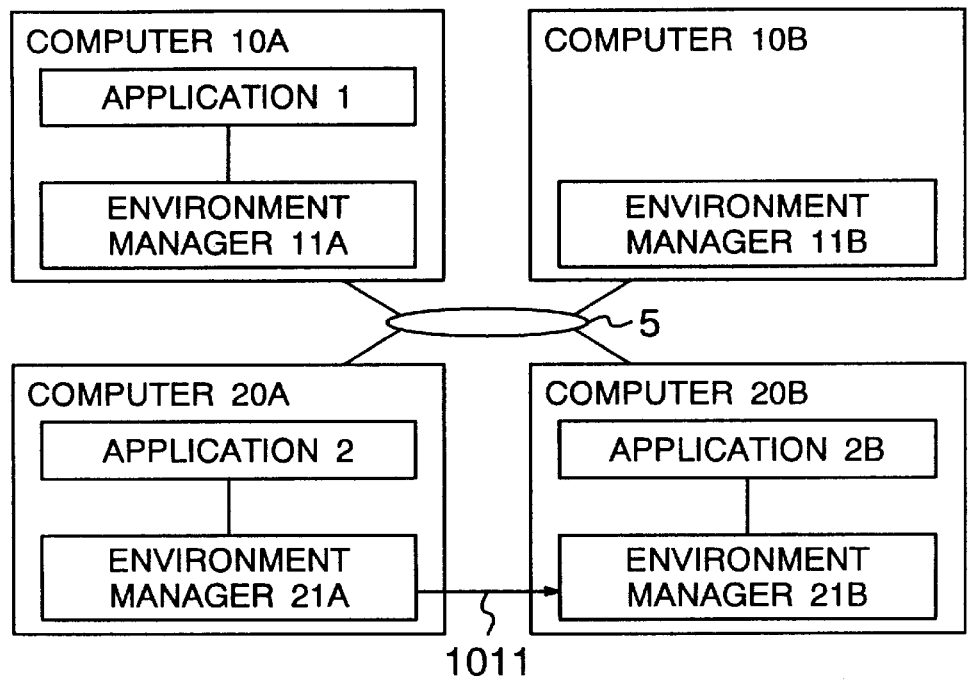
FIG. 10 is a diagram showing a target example to which the embodiment of the invention is applied.
Figure 11:
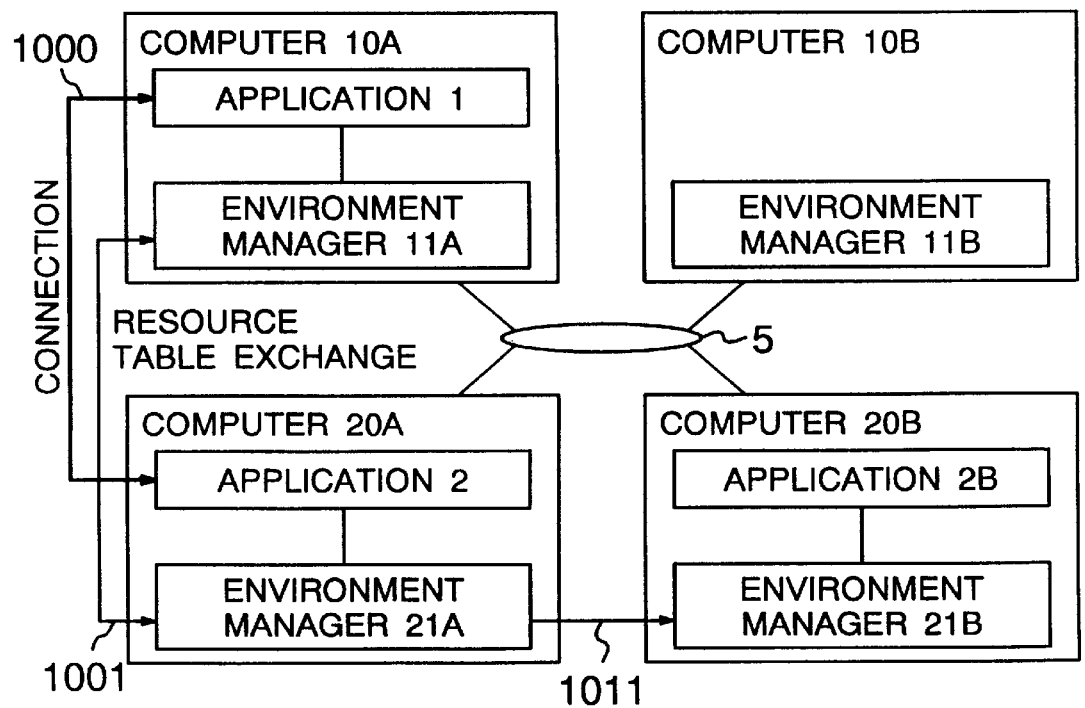
FIG. 11 is a diagram showing attention in an outline of the operation in the embodiment of the invention in FIG. 10.

FIGS. 10 and 11 are diagrams showing attention points when applying the embodiment. FIG. 10 is a first state diagram. FIG. 11 is a second state diagram after the state of FIG. 10.

In FIG. 10, total four computers 10A, 10B, 20A, and 20B are mutually connected by the network 5. Although not shown, in FIGS. 10 and 12, the computing resources (processors) and the OS exist in a manner similar to FIG. 1. It is assumed that the application 1 of the computer 10A can use the computing resources (processors) of the two computers 10A and 10B through the environment managers 11A and 11B. The application 2 of the computer 20A and an application 2B of the computer 20B can use the computing resources (processors) of the two computers 20A and 20B through the environment managers 21A and 21B. It is assumed that the applications 2 and 2B are applications which have independently been being executed. Further, for example, when a change occurs in the contents of the resource table of the environment manager 21A by the new addition of a computer or the change in load of the existing computer, such a change is immediately reflected to the environment manager 21B (1011) (by the method which has already been described in the description of the procedure (c) and the item of the setting of the environment).

FIG. 11 is the second state diagram showing one of realizing methods of expanding the environment in the embodiment and is a diagram after FIG. 10. In case of setting the state of FIG. 11 by establishing a connection (1000) between the applications 1 and 2 in FIG. 10, before both of the applications start a communication, the environment managers 11A and 21A corresponding to those applications exchange the contents of the resource tables (1001) and add the received contents into the self resource table, respectively. Thus, the applications 1 and 2 can share the mutual resources and both of the applications can use the processors of the four computers 10A, 10B, 20A, and 20B. That is, the expansion of the environment is realized.

However, when the resource table of the environment manager 21B also changes in accordance with the change in resource table of the environment manager 21A, the application 2B can also use the above four computers. That is, when the application 2B is being executed irrespective of the application 2, it is undesirable that the environment is expanded by the method of FIG. 11 and the application 2B can use the computers 10A and 10B.

Figure 12:
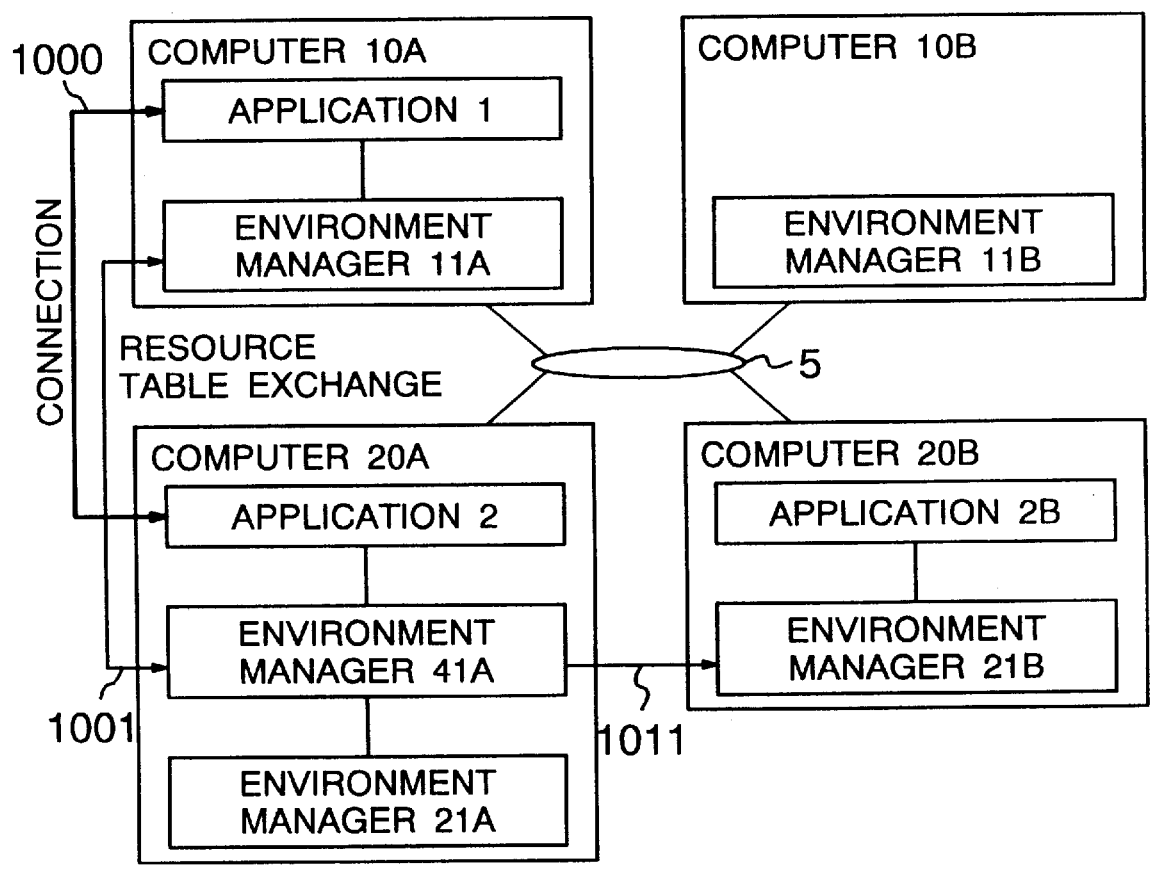
FIG. 12 is a diagram showing an outline of the operation in the embodiment of the invention in FIG. 10.

FIG. 12 is a diagram for explaining the invention in consideration of the attention points shown in FIGS. 10 and 11. In the invention, a function to copy the environment managers is provided. While setting the connection 1000 between the applications 1 and 2 to an opportunity, the environment managers 11A and 21A are first copied and environment managers 31A and 41A which belong to the respective environment managers are formed. FIG. 12 shows locations where the environment manager 11A and the copied environment manager 31A exist in the computer 10A and the environment manager 21A and the copied environment manager 41A exist in the computer 20A. The contents of the resource table of the environment manager 31A are the same as the contents of the resource table of the environment manager 11A. The contents of the resource table of the environment manager 41A are the same as the contents of the resource table of the environment manager 21A. After the environment managers 31A and 41A were formed, the exchange 1001 of the resource tables is executed between the environment manager 31A and the environment manager 41A, so that the environments of the applications 1 and 2 are expanded. The applications 1 and 2 are executed by using the expanded environment. That is, only the applications 1 and 2 which mutually communicate can expand the environments without exerting an influence on the environment of the application 2B which is not concerned with the application which started the communication.

The contents of the resource tables of the environment managers 11A, 11B, 21A, and 21B existing before the copy don't change, so that the available computing resources of the application 2B don't change. That is, since the copy of the environment managers is performed and the environments are expanded between the copied environment managers, no influence is exerted on the environment of the other application 2B.

When the applications 1 and 2 are again not related to each other, it is desirable that the environment of each application is returned to the environment before it is expanded by the above method. In the embodiment, the environment managers 31A and 41A detect the end of the communication between the applications 1 and 2 and finish the execution of the environment managers. As mentioned above, the applications 1 and 2 delete the expanded environments and execute the subsequent processes through the environment managers 11A and 21A while using the distributed computing resources. As mentioned above, according to the embodiment, the environment of the application can be easily returned to the environment before it is expanded.

With respect to the expanding method of the environment in the embodiment described so far, the operations of each portion will now be described in detail hereinbelow in accordance with the order of the method of copying the environment managers, the expanding method of the environment while setting the communication between the applications to an opportunity, and the method of recovering the environment before the expansion at the end of the communication between the applications.

Figure 8:
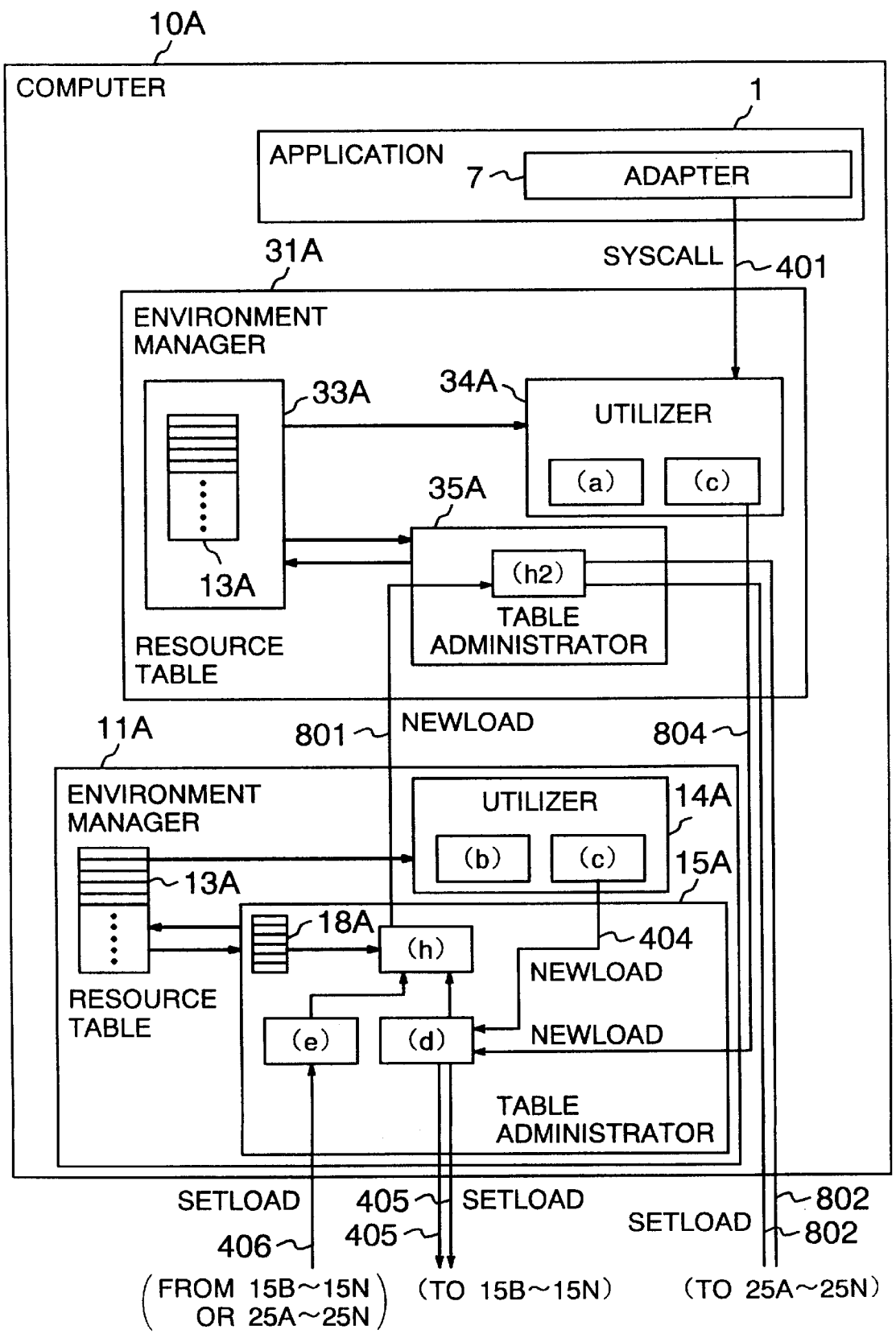
FIG. 8 is a diagram showing a procedure to realize a use of distributed computing resources from applications after the environment manager was copied in the embodiment of the invention.

(7) Copy of Environment Managers:

FIGS. 7 and 8 show means for realizing a function for allowing the environment manager 11A to form the copy of itself in a state in which the environment managers 11A to 11N and environment managers 21A to 21N shown in FIG. 1 exist. The function to form the copy is used when the environment manager 31A which belongs to the environment manager 11A and is a copy of the environment manager 11A is formed in the means for expanding the resource table, which will be explained herein later.

With respect to the formation of the environment manager 31A, the following procedures are provided for the utilizer 14A in the environment manager 11A.

(f) The utilizer 14A issues the "fork" request to the OS 3, thereby forming the utilizer 34A as a copy of itself and executing the utilizer 34A (701).

The utilizer 34A formed newly is formed by the "fork" request and, fundamentally, has the procedures (a), (b), and (c) and the other procedures which the utilizer 14A has.

Further, the utilizer 34A has a function (procedure) for referring the resource table 13A which is available by the utilizer 14A from the utilizer 34A. In a manner similar to the utilizer 14A, the utilizer 34A has a function for notifying the table administrator 15A and adapter 7.

(f2) The utilizer 34A assures a main storing area for the resource table 33A (703). Subsequently, the "fork" request to form and execute the table administrator 35A is issued to the OS 3 (704). After that, an SUBEMS message 705 is transmitted to the table administrator 15A, thereby notifying of a fact that the table administrator 35A was newly formed. Further, an SUBEMS message 702 is transmitted to the adapter 7 inserted into the program of the application 1. After the SUBEMS message 702 was received, the SUBEMS message 702 requests the adapter to send the request for the OS 3 detected in the application 1 to the utilizer 34A.

The management table 18A is provided for the table administrator 15A of the environment manager 11A. The management table 18A is a memory area which can be referred from the table administrator 35A formed by the copy. The addresses of all of the environment managers (including the environment manager 31A) which belong to the environment manager 11A are stored in the management table 18A. The management table 18A can be formed by the table administrator 15A when the environment manager 11A executes the copy for the first time or can be also provided for the table administrator 15A from the beginning.

The following procedures are provided for the table administrator 15A.

(g) The address of the table administrator 35A is added into the management table 18A on the basis of the SUBEMS message 705 sent from the table administrator 35A by the procedure (f2).

(h) Subsequent to the procedures (d) and (e), the management table 18A is referred to and a same NEWLOAD message 801 as that sent to the environment managers 11B to 11N is transmitted to the table administrator 35A of the environment manager disclosed there.

The table administrator 35A has the procedures (d) and (e) and the other procedures which the table administrator 15A has. The resource table 33A can be referred in a manner similar to the utilizer 34A. The following procedures are provided for the table administrator 35A.

(g2) The table administrator 35A forms the resource table 33A including the resource table 13A as a part.

(h2) When the NEWLOAD message 801 sent from the table administrator 15A is received in the procedure (h), the table administrator 35A compares the address 131 of the environment manager disclosed in each entry 130 of the resource table 33A with the address 131 of the environment manager disclosed in the entry 130 written in the data 203 of the received NEWLOAD message. The entry 130 which coincides is found out and if the contents of the entry differ, it is replaced to the entry 130 disclosed in the data 203 of the NEWLOAD message. Further, if the replaced entry of the resource table 33A is the entry of the resource table 13A, each entry other than the resource table 13A in the address resource table 33A of the environment manager is referred to. An SETLOAD message 802 is transmitted by the same means as that of the procedure (d) to table administrators (25A to 25N in FIG. 8) of the environment managers of the addresses disclosed in the entries, thereby notifying of a fact that the change occurred in the load of the processor disclosed in the resource table 13A.

By providing the above procedures, the environment manager 31A comprising the resource table 33A, utilizer 34A, and table administrator 35A is formed.

The application 1 can use the distributed computing resources (processors) disclosed in the resource table 33A through the environment manager 31A in a manner similar to that executed through the environment manager 11A so far.

That is, the SYSCALL message sent from the adapter 7 of the application 1 is received in the utilizer 34A. The utilizer 34A calls the procedure (a), selects the optimum (small load) computer from the entries disclosed in the resource table 33A, transmits the REXEC message which has already been mentioned to the environment manager disclosed in the entry, and newly executes the application on the computer.

After the REXEC message was transmitted, the procedure (c) of the utilizer 34A is subsequently called and the NEWLOAD message is transmitted in order to notify of a fact that the load of one of the computers disclosed in the resource table 33A changed. The procedure (c) of the utilizer 34A sends the NEWLOAD message to the table administrator 15A in a manner similar to the procedure (c) of the utilizer 14A (804).

The REXEC message from another computer is received by the utilizer 14A in a manner similar to the case before copying the environment manager 11A. The procedure (b) of the utilizer 14A is called and processed. The NEWLOAD message is transmitted to the table administrator 15A by the procedure (c) of the utilizer 14A (404).

The procedures (h) and (h2) provided above are procedures for notifying the change in load on one computer to all of the concerning environment managers by the SETLOAD message and updating the state of the resource table of each environment manager even after the environment manager was copied in a manner similar to the case before copying.

The transmission of the SETLOAD message to the environment managers (more accurately, the table administrators of the environment managers) disclosed in the resource table 13A is executed by the table administrator 15A in a manner similar to the case before copying the environment manager. Among the environment managers disclosed in the resource table 33A, the transmission of the SETLOAD message to the environment managers other than those disclosed in the resource table 13A is performed in the table administrator 35A by the procedure (h2).

On the other hand, the reception of the SETLOAD message is executed by the procedure (e) of the table administrator 15A in a manner similar to the case before copying the environment manager. In the case where the environment managers which belong to the environment manager 11A exist (such an existence can be checked by the management table 18A), subsequent to the procedure (e), the procedure (h) is called. The procedure (h) transmits the NEWLOAD message 801 to the table administrator 35A and updates the resource table 33A.

(8) Expansion of resource table:

In the embodiment, since the environment that is used by the application is determined by the contents of the resource table of the environment manager, by adding the contents of the resource table, the environment which is available for the application can be expanded. As a specific method of adding the contents of the resource table, for example, in a state in which the application 1 already can use the processors of the computers 10A to 10N in FIG. 1, if it is intended to further expand the environment, the entries corresponding to the processors other than the processors 16A to 16N are added to the entries of the resource table 13A of the environment manager 11A. Thus, the number of processors which are available for the application 1 increases and a possibility such that the executing speed of the application is raised by the load balancing rises.

Figure 9:
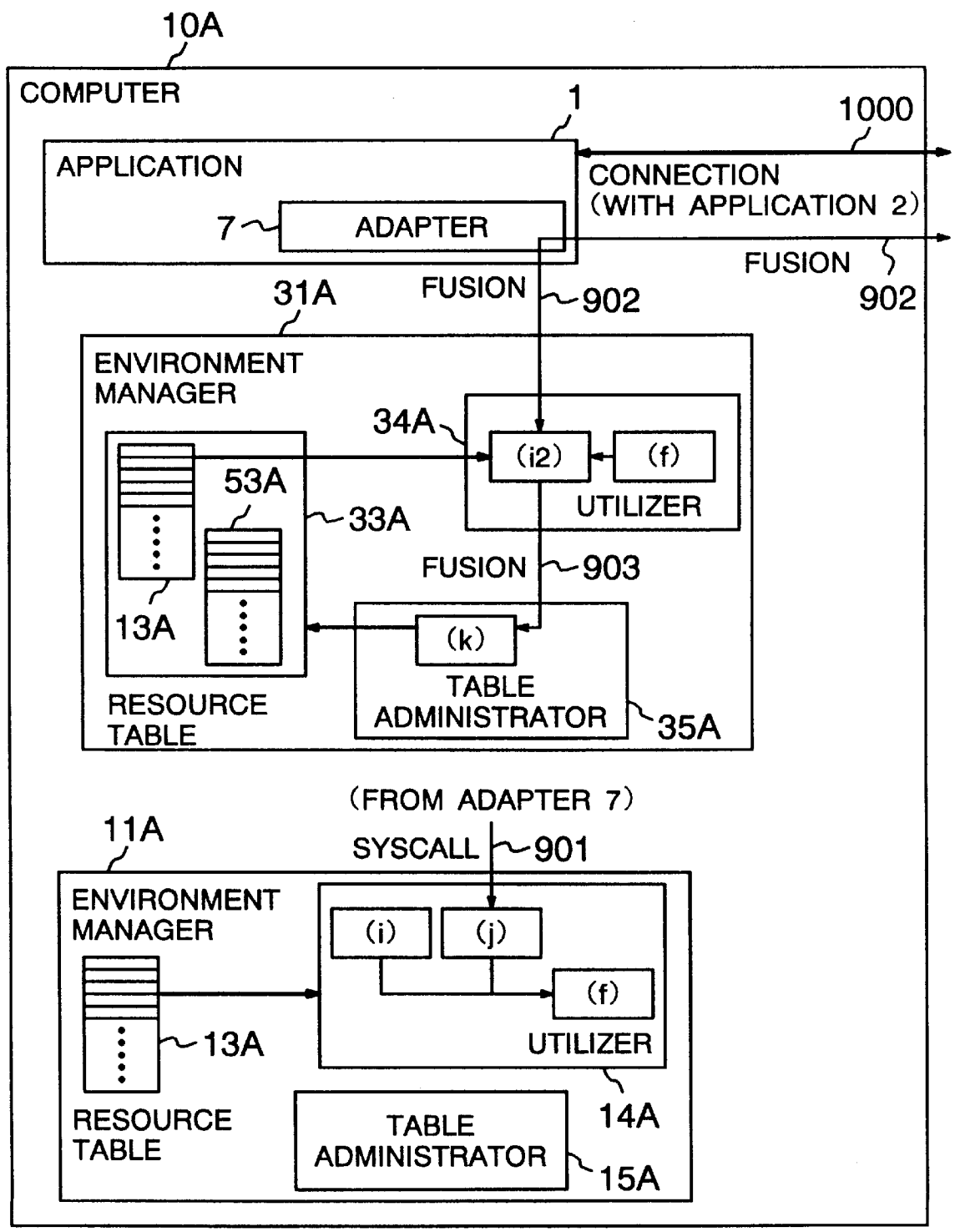
FIG. 9 is a diagram showing a procedure to realize an expansion of a resource table in the embodiment of the invention.

The procedure to expand the resource table will now be described by using FIGS. 9 and 1. FIG. 9 shows an internal function of the computer in case of explaining the expansion of the resource table when the environment managers are copied. Each of the computers in FIG. 1 has such an internal function. It is now assumed that the application 1 can use the processors 16 to 16N by the environment managers 11A to 1N on the computers 10A to 10N. It is also assumed that the application 2 can use the processors 26A to 26N by the environment managers 21A to 21N on the computers 20A to 20N.

The following procedures are first provided for the utilizer 14A.

(i) The application 1 detects the "connect" request in which the connection to the application 2 is designated (901). When the connection 1000 is established, the procedure (f) is executed and the environment manager 31A is formed and executed.

(j) The "accept" request of the application 1 is detected (901). When the connection is established, the procedure (f) is executed and the environment manager 31A is formed and executed.

The following procedures are provided for the utilizer 34A.

(i2) After the procedure (f2), before the applications 1 and 2 start the communication, the contents of the resource table 33A are transmitted as data 203 of an FUSION message 902 through the connection established between both of the applications. The FUSION message 902 received from the connection is transmitted to the table administrator 35A (903).

The following functions are further provided for the table administrator 35A.

(k) By the procedures (i) and (j), the contents sent from the utilizer 34A are used as an expansion component 53A to the resource table 33A, thereby updating the resource table 33A.

By providing the procedures shown above for the environment managers 11A and 21A, the application 1 newly use the processors 26A to 26N which are available by the application 2 while setting the communication with the application 2 to an opportunity.

Explaining in more detail, when the application 1 tries to communicate with the application 2, the application 1 requests the connection to the application 2. If the application 2 accepts the connection, one connection is established between the applications 1 and 2. In this instance, before the applications 1 and 2 start the communication through the connection established, the copy 31A of the environment manager 11A and the copy (it is assumed the environment manager 41A) of the environment manager 21A are formed and executed by the procedure (i) in the environment manager 11A and by the procedure (j) in the environment manager 21A.

Into the environment manager 31A, the contents of the resource table 23A are sent to the utilizer 34A through the connection established between both of the applications by the procedure (i2). The utilizer 34A sends them to the table administrator 35A. The table administrator 35A adds the received contents of the resource table 23A into the resource table 33A by the procedure (k). Thus, the resource table 33A increases the number of entries by only the number of processors 26A to 26N. The application 1 can subsequently use the processors 26A to 26N in addition to the processors 16A to 16N which could be used so far through the environment manager 31A on the basis of the procedures (a) to (e) which have already been mentioned.

On the contrary, in the case where the application 1 performs the "accept" request and the connection request from the application 2 arrives at the application 1 after that, the procedure (i) is called in the environment manager 11A and the procedure (j) is called in the environment manager 21A. Similarly, the processors 26A to 26N can be newly used.

With respect to the environment manager as a copy of the environment manager 21A, the same as the environment manager 31A shall also similarly apply.

In the procedures (i) and (j), when the environment manager 31A as a copy and the environment manager (it is now assumed to environment manager 41A) as a copy of the environment manager 21A communicate, the connection established between the applications 1 and 2 is used. In this case, there are the following advantages.

In case of expanding the processor which is available for the application itself in a form such as to follow the processor which is available for the application on the peer side while setting the communication between both of the applications to an opportunity, in the embodiment, a procedure to transmit and receive the resource table between the environment manager 31A and the environment manager 41A is necessary. However, the method of communicating to the environment manager 21A (or 41A) is not disclosed in the resource table 13A (therefore, in the resource table 33A as well) and the same shall also similarly apply to the resource table 23A (or 43A). However, now assuming that the applications 1 and 2 can communicate, ordinarily, at least one of both applications knows the method of communicating to the over application or a knowing method exists. Therefore, in the procedures (i) and (j), after the connection between both of the applications was established, before notifying the application of such a fact, the environment managers 31A and 41A transmit the mutual resource tables through the established connection. Therefore, there is an advantage such that when the resource table is expanded while setting the communication between the applications 1 and 2 to an opportunity, the environment managers 11A and 21A don't need to preliminarily know the method of communicating to the peer environment manager.

As mentioned above, according to the embodiment, the environment managers are first copied while setting the start of the communication between the applications 1 and 2 to an opportunity and, after that, the copied environment managers 31A and 41A mutually transmit the own resource tables 33A and 43A and add the received resource table into the own resource table. Thus, only the applications 1 and 2 can use the peer distributed computing resources. The expansion of the environment can be cancelled immediately after completion of the cooperative processing of the applications 1 and 2. In the embodiment, therefore, a situation such that a certain application illegally uses the distributed computing resources which are available for the other application can be prevented.

(9) Recovery of resource table after the end of communication:

In case of expanding the mutual environment in a state in which the computing resources which are available for an application itself can be also used by the peer while setting the communication between the applications 1 and 2 to an opportunity, it is practically desirable to construct in a rule such that at a time point when the cooperative processing of both applications is finished, the computing resources which are available for the peer cannot be used any more by the application itself. To realize such a function, in the embodiment, the following procedures are provided for the utilizer 34A of the environment manager 31A. In the description here, although FIG. 7 showing the state after the environment managers were copied is referred, the procedure itself regarding the recovering operations is not shown.

(m2) When it is detected that the "close" or "shutdown" requests from the application 1 to the OS 3 has been issued, the SUBEME message is transmitted to the adapter 7. After that, the utilizer 14A of the environment manager 11A is notified so as to send the SYSCALL message. Subsequently, the SUBEME message is transmitted to the table administrator 15A, thereby notifying of a fact that the environment manager 31A is finished. After that, the table administrator 35A is finished and the application itself is also finished.

The following procedures are provided for the utilizer 14A of the environment manager 11A.

(m) The SUBEME message from the utilizer 34A is received and the entry corresponding to the environment manager 31A is deleted from the management table 18A.

Thus, after the end of the communication to the application 2, the application 1 can continue the execution while using the distributed computing resources which could be used before expansion through the environment manager 11A. For example, after that, even when the application 1 communicates to an application different from the application 2, the available distributed computing resources can be similarly provided to each other by repeating the procedures mentioned above.

In the invention, two applications to newly start a communication can enable the application of the communication peer to also use the distributed computing resources which could be used by itself so far. Thus, the application can effectively use the more distributed computing resources and can raise an execution performance of the application. Particularly, when the applications need to communicate via the wide area network, the available distributed computing resources can be largely expanded.

What is claimed is:

1. A method for managing computing resources in a plurality of computers which are mutually connected by a network with each computer comprising an application and an environment manager including a resource table for managing computing resources which are available for said application, said method comprising the steps of:

when a first application on the computer initiates communication with a second application on the computer over said network, detecting said communication between the first application and the second application;

when said communication is detected, copying a resource table of the first application which records the computing resources available for the first application and contains addresses of environment managers from different computers in said network concerning with the first application for enabling a corresponding environment manager to manage the computing resources which are available for said first application and forming a first table, and copying a resource table of the second application which records the computing resources available for the second application and contains addresses of environment managers from different computers in said network concerning with the second application for enabling a corresponding environment manager to manage the computing resources which are available for said second application and forming a second table;

adding contents of said second table into said first table, and adding contents of said first table into said second table;

executing said communication by said first application with reference to said first table in which the contents of said second table were added; and executing said communication by said second application with reference to said second table in which the contents of said first table were added.

2. A method according to claim 1, wherein said resource table of one of the first application and the second application to manage the computing resources which are available for a respective one of said first application and said second application is provided in the computer including the application.

3. A method for managing distributed computing resources in distributed computers mutually connected by a network with each computer comprising an application and an environment manager for managing computing resources which are available for said application on each computer, said method comprising the steps of:

when an application initiates communication with another application, detecting said communication from said application to said another application;

transmitting information indicative of the computing resources of said application to the computer including said another application in accordance with detection of said communication from said application to said another application; and forming information indicative of the computing resources for both of said application and said another application by the computer including said another application in accordance with reception of transmitted information indicative of the computing resources of said application, wherein the information indicative of the computer resources of said another application is first copied and received information indicative of the computing resources of said application is subsequently added to copied information indicative of the computing resources of said another application by a corresponding environment manager for managing the computer resources which are available for said application.

4. A method according to claim 3, wherein said computing resources which are available for said application are provided in correspondence to said application, respectively.

5. A method according to claim 4, wherein said information indicative of the computing resources includes load information of a plurality of processors which are distributed and exist on said network.

6. A method according to claim 4, wherein said application and said another application have a relation between a client and a server.

7. A method according to claim 3, further comprising the step of forming a copy of the information indicative of the computing resources of said application in accordance with detection of said communication from said application to said another application.

8. A method according to claim 7, wherein said information indicative of the computing resources includes load information of a plurality of processors which are distributed and exist on said network.

9. A method according to claim 7, wherein said application and said another application have a relation between a client and a server.

10. A method according to claim 3, wherein said information indicative of the computing resources includes load information of a plurality of processors which are distributed and exist on said network.

11. A method according to claim 3, wherein said application and said another application have a relation between a client and a server.

12. A distributed computing system, comprising:

a first computer containing at least a first application and an environment manager including a resource table which records computing resources available for the first application and contains addresses of environment managers from different computers in a network concerning with the first application; and a second computer operatively connected to said first computer by said network, containing at least a second application and an environment manager including a resource table which records computing resources available for the second application and contains addresses of environment managers from different computers in said network concerning with the second application, wherein the resource tables of respective environment managers of the first and second computers are mutually copied, when one application of one of the first and second computers executes a cooperative processing together with another application of another one of the first and second computers over said network, to form new resource tables for enabling each application from any one of the first and second computers to use and exchange the computer resources of both the first and second computers over said network.

13. A distributed computing system according to claim 12, wherein each environment manager of the first and second computers includes an utilizer which determines proper computing resources available, and a table administrator which manages the resource table, including updating, adding, delete, and changing information contained therein.

14. A distributed computing system according to claim 12, wherein said first and second computers mutually copy computing resource information contained in the resource table of the respective application, when one application of one of the first and second computers independently executes a cooperative processing together with another application of another one of the first and second computers over said network, and allow the respective application to execute in accordance with the new resource table respectively.

15. A distributed computing system according to claim 14, wherein said computer resource information includes load information of a plurality of processors distributed over said network.

16. A distributed computer system according to claim 15, wherein said first computer corresponds to a central server and said second computer corresponds to a client computer.

17. A distributed computer system according to claim 14, wherein said first computer corresponds to a central server and said second computer corresponds to a client computer.

18. A distributed computing system according to claim 12, wherein said first computer corresponds to a central server and said second computer corresponds to a client computer.

* * * * *